United States Patent
Spencer

(10) Patent No.: US 9,417,121 B1
(45) Date of Patent: Aug. 16, 2016

(54) METHODS AND APPARATUSES USING OPTICS WITH APERTURE FOR PASSING OPTICAL SIGNALS BETWEEN INPUT AND OUTPUT STAGES

(71) Applicant: James E. Spencer, Menlo Park, CA (US)

(72) Inventor: James E. Spencer, Menlo Park, CA (US)

( * ) Notice: Subject to any disclaimer, the term of this patent is extended or adjusted under 35 U.S.C. 154(b) by 129 days.

(21) Appl. No.: 14/296,314

(22) Filed: Jun. 4, 2014

Related U.S. Application Data

(60) Provisional application No. 61/830,846, filed on Jun. 4, 2013.

(51) Int. Cl.
*G01J 1/04* (2006.01)
*H04B 10/67* (2013.01)

(52) U.S. Cl.
CPC ............. *G01J 1/0407* (2013.01); *G01J 1/0437* (2013.01); *H04B 10/67* (2013.01)

(58) Field of Classification Search
CPC .......... G02B 6/02042; G02B 6/02328; G02B 6/02347; G02B 6/02352; G02B 6/032
See application file for complete search history.

(56) References Cited

U.S. PATENT DOCUMENTS

| | | | |
|---|---|---|---|
| 6,134,043 A | 10/2000 | Johnson et al. | |
| 6,301,420 B1 | 10/2001 | Greenaway et al. | |
| 6,452,713 B1 | 9/2002 | White | |
| 6,654,522 B2 | 11/2003 | Chandalia et al. | |
| 6,801,107 B2 | 10/2004 | Chen et al. | |
| 7,551,819 B2 | 6/2009 | Dangui et al. | |
| 8,410,729 B2 | 4/2013 | Spencer et al. | |
| 2009/0072744 A1 | 3/2009 | Botto et al. | |
| 2010/0265385 A1* | 10/2010 | Knight | H04N 5/232 348/340 |
| 2014/0178022 A1 | 6/2014 | Spencer et al. | |

FOREIGN PATENT DOCUMENTS

WO 2007143473 A1 12/2007

OTHER PUBLICATIONS

B. Kuhlmey. "CUDOS MOF Utilities, User's Guide," Univ. of Sydney, Australia, NSW 2006.
C.K. Ng et al. "Transmission and Radiation of an Accelerating Mode in PBG", PRSTAB 13, 121301 (2010).
J. England et al., "Coupler Studies for PBG Fiber Accelerators", PAC11, New York, NY, Mar. 28, 2011.
R. Nobel and J. Spencer. "Hollow-core photonic band gap fibers for particle acceleration." Phys. Rev. ST Accel. Beams 14, 121303 (2011). Filed as Appendix of underlying provisional patent application.
M. Broxton et al. "Wave optics theory and 3-D deconvolution for the light field microscope." Optics Express 25418, Oct. 17, 2013.
B. D. Layer et al. "Ultrahigh-Intensity Optical Slow-Wave Structure." Physical Review Letters, 035001-1, Jul. 20, 2007.

(Continued)

*Primary Examiner* — Francis M Legasse, Jr.
(74) *Attorney, Agent, or Firm* — Crawford Maunu PLLC

(57) ABSTRACT

Aspects of the present disclosure are directed to processing optical signals. As may be implemented in accordance with one or more embodiments, an aperture receives a plurality of optical signals and passes the signals to one or more optical processing stages. Each stage includes a plurality of optical detectors and an optical element that operates with the aperture to provide optical signals from inputs of the stage to at least one of an output of the stage and respective ones of the plurality of optical detectors.

18 Claims, 5 Drawing Sheets

(56) References Cited

OTHER PUBLICATIONS

A. G. York and H. M. Milchberg. "Direct Acceleration of Electrons in a Corrugated Plasma Waveguide." Physical Review Letters, 195001-1, May 16, 2008.

X. E. Lin. "Photonic band gap fiber accelerator." Physical Review Special Topics—Accelerators and Beams, vol. 4, 051301, May 31, 2001.

Tibken, Shara, "Google Glass Patent Application Gets Really Technical," Feb. 21, 2013, http://news.cnet.com/8301-1023_3-57570533-93/google-glass-patent-application-gets-really-technical.

Real-Time Applications of Neural Nets, J.E. Spencer, Invited Talk at Real Time Computer Applications in Nuclear, Particle and Plasma Physics, Williamsburg, VA, May 16-19. Publ. in IEEE Transactions NS-36 (1989) 1480-5.

Computation and Control with Neural Networks, A. Corneliusen, P. Terdal, T. Knight and J. Spencer, Nuclear Instruments and Methods in Physics Research A293 (1990) 507-516.

* cited by examiner

METHODS AND APPARATUSES USING OPTICS WITH APERTURE FOR PASSING OPTICAL SIGNALS BETWEEN INPUT AND OUTPUT STAGES

FIELD

Aspects of various embodiments are directed to passing light, with particular aspects directed to input/output devices and related methods.

BACKGROUND

Many types of communication interfaces are implemented for use in a variety of fields, as may be necessary for communicating with various electronic devices such as telephones, computers and others. As the use of such devices becomes increasingly widespread, and as the desirability for convenient communication increases, demand for manners in which to interface with these devices becomes greater.

While such devices have become increasingly functional, their use has been somewhat limited for certain applications. For example, interfaces have generally been limited to user-based interfaces that may not be amenable to rapid data collection. As such, application has been limited or otherwise difficult in the context of a machine-type interface, and others. These and other matters have presented challenges to light collection, data acquisition and processing, for a variety of applications.

SUMMARY

Various example embodiments are directed to input/output devices and their implementation. In accordance with various example embodiments, light from various sources is collected and processed. In accordance with various embodiments, apparatuses and/or methods involve optical parallel processing of light.

In accordance with another embodiment, an apparatus includes an aperture that receives a plurality of optical signals, and one or more optical processing stages having inputs coupled to receive the plurality of optical signals as passed via the aperture. Each stage includes optical detectors and an optical element that provides optical signals from inputs of the stage to one or both of an output and the optical detectors (or a subset, or one, thereof).

Another embodiment is directed to a method as follows. Optical signals are received via an aperture. In each of a plurality of optical stages, a plurality of optical signals is received, as passed via the aperture, and optical signals are provided from inputs of the stage to at least one of an output and respective ones of the plurality of optical detectors. In some embodiments, one of the optical detectors outputs an optical signal in response to the sum of optical signals input to the first one of the optical detectors exceeding a first limit, and another one of the optical detectors outputs an optical signal in response to the sum of optical signals input to the second one of the optical detectors exceeding a second limit. The second limit may be the same as, or different than, the first limit.

The above discussion/summary is not intended to describe each embodiment or every implementation of the present disclosure. The figures and detailed description that follow also exemplify various embodiments.

BRIEF DESCRIPTION OF THE DRAWINGS

Various example embodiments may be more completely understood in consideration of the following detailed description in connection with the accompanying drawings, in which.

Figure 1:
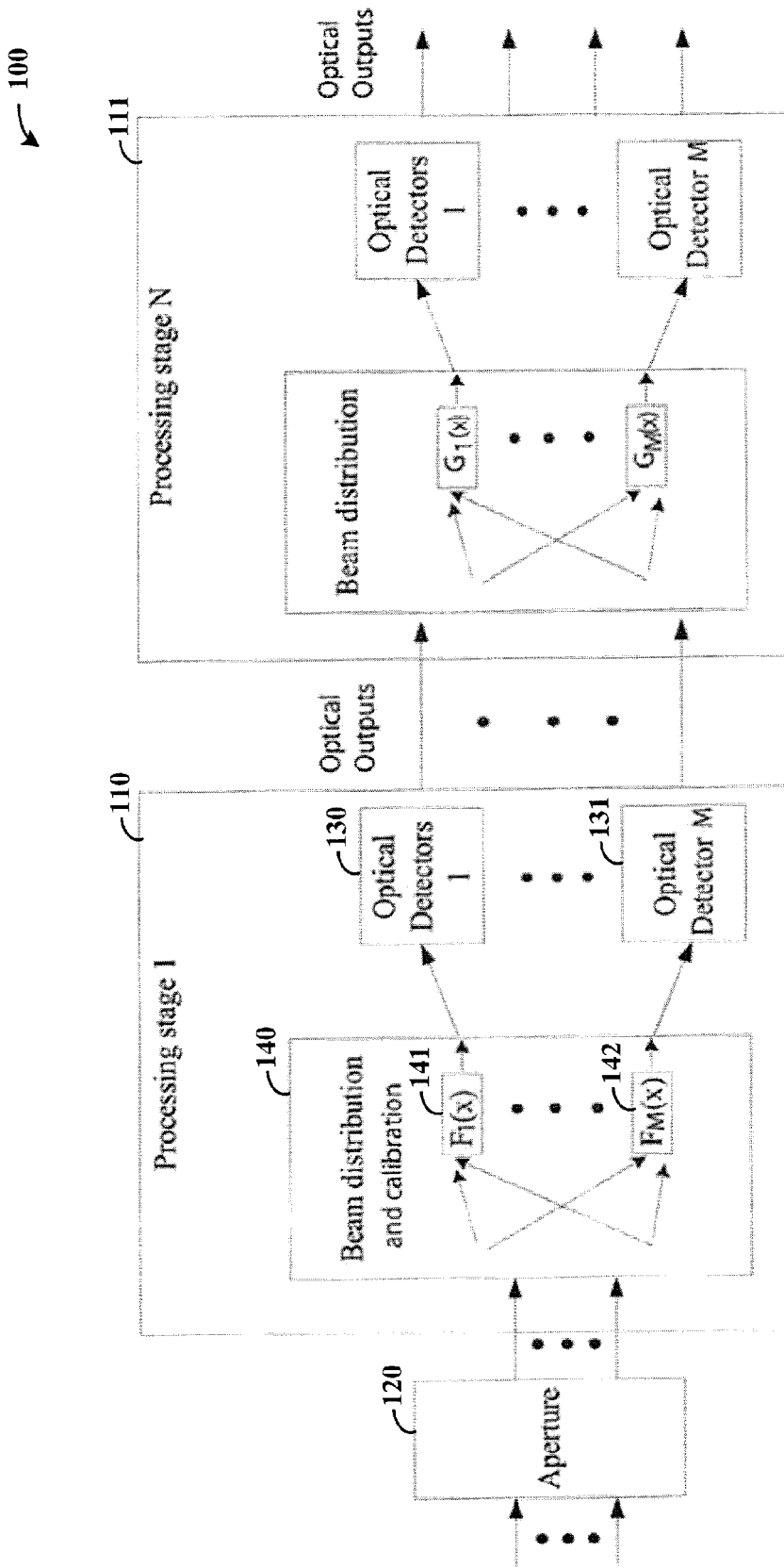
FIG. 1 shows a schematic of an apparatus including an optical analysis network in accordance with one or more embodiments of the present disclosure.

While the disclosure is amenable to various modifications and alternative forms, specifics thereof have been shown by way of example in the drawings and will be described in detail. It should be understood, however, that the disclosure is not limited only to the particular embodiments described. On the contrary, the disclosure is to cover all modifications, equivalents, and alternatives falling within the scope of the disclosure including aspects defined in the claims. In addition, the term "example," as used throughout this application, is only by way of illustration, and not limitation.

DESCRIPTION

Various aspects of the present disclosure are directed toward optical processing apparatuses, methods of using such apparatuses, and methods of manufacturing such apparatus. Some aspects of the present disclosure are directed toward an apparatus (e.g., an optical network) having an aperture configured to receive a plurality of optical signals. The apparatus includes one or more optical processing stages. A first one of the optical processing stages has inputs coupled to receive the plurality of optical signals. Each of the stages includes a plurality of optical detectors and a means for beam distribution. The means for beam distribution is configured to provide optical signals from inputs of the stage to the respective plurality of optical detectors or other monitors or outputs, e.g., to a subsequent layer without necessarily changing either the shape or intensity of any signal pulse. In some implementations, signal conditioning is used to linearly scale pulses up or down, such as for making a copy of an input for use independent of a base input array.

In various embodiments, the means for beam distribution may connect the optical detectors of the plurality of processing stages in various arrangements with different connection weights to derive information from the optical signals. The means for beam distribution may include, for instance, beam splitters, dichroic mirrors, and/or filters, lenslets, collimators, attenuators, and/or combiners. In some embodiments, an apparatus includes means for beam distribution, for at least one of the optical processing stages, that includes filters configured to adjust amplitudes of the signals based on feedback from this or another of the processing stages. In some embodiments, one or more optical processing stages includes a micro array of one or more loops and/or dots with at least two or more orthogonal loops at each node for a variety of purposes including determination of polarization and pulse shape.

In some embodiments, one or more of the optical detectors is configured to produce a signal dependent on a sum of optical signals provided to the optical detector by the means of the beam distribution of the corresponding stage. Some optical detectors may be configured to produce an optical signal that may be processed by one or more further processing stages in an optical analysis network. Some optical detectors may be configured to produce an electronic signal that may be output for use or additional processing for one or more conventional electronic circuits. In some embodiments, one or more of the optical detectors may be configured to output an optical signal in response to a condition that the sum of optical signals input to the optical detector exceeds some fraction or respective limit of the optical detector. For instance, on some implementations, a first one of the optical detectors may be configured to output an optical signal in response to the sum of optical signals input to the first one of the optical detectors exceeding a first limit, and a second one of the optical detectors is configured to output an optical signal in response to the sum of optical signals input to the second one of the optical detectors exceeding a second limit that is different from the first limit.

Some various aspects of the present disclosure are directed toward an apparatus, which is arranged in a number (N) of stacked semiconductor wafers that can perform optical arithmetic operations on the order of or equal to 1% of the 2.5 nanoseconds demonstrated for an electronic equivalent.

In some embodiments, the apparatus may include a semiconductor wafer configured with a matrix of pillars. Each pillar is configured with a respective amount of oxidation to have a respective field breakdown and/or frequency transmission range. In some embodiments, the apparatus includes plurality of stacked semiconductor wafers separated by respective oxide layers. In some embodiments, the apparatus includes carbon nanotubes configured and arranged to form a nanotube matrix.

Various embodiments of the present disclosure may be applied to a number of applications involving processing of optical signals. Some various aspects of the present disclosure are directed toward an apparatus configured to receive and process the plurality of optical signals in parallel. Some various aspects of the present disclosure are directed toward an optical analysis network computer including an apparatus as described above. Some various aspects of the present disclosure are directed toward a mobile device including an apparatus as described above with dimensions comparable to current cell phones. Further, various embodiments of the present disclosure are directed toward a method of using and/or a method of making an apparatus disclosed herein.

In accordance with another example embodiment, an optical apparatus includes an aperture that receives a plurality of optical signals, and one or more optical processing stages having inputs coupled to receive the plurality of optical signals as passed via the aperture. In some implementations, the aperture modifies light in accordance with at least one of intensity and polarization. Each processing stage includes optical detectors and an optical element that provides optical signals from inputs of the stage to one or both of an output and the optical detectors (or a subset, or one, thereof). The optical element may include, for example, one or more of a beam splitter, dichroic mirror, filter, lenslet, collimator, attenuator, and combiner. In some implementations, a filter adjusts amplitude of each optical signal based on feedback from one or more of the optical processing stages.

In some embodiments, a first one of the stages provides optical signals to a second one of the stages, via the output. In certain applications, the optical signals are processed in two or more stages, via distribution of the signals to multiple stages and processing within each stage. The distribution may, for example, be via serially-arranged stages with the signals passed from stage-to-stage, or in parallel to multiple stages at once. In a more particular embodiment, the apparatus also includes an optical processor that detects correlations between parallel optical data sets that are simultaneously input to the at least one optical processing stage.

The optical detectors may be implemented in a variety of manners, to detect or otherwise characterize the signals. In some embodiments, a first one of the optical detectors outputs an optical signal in response to the sum of optical signals input to the first one of the optical detectors exceeding a first limit, providing an indication that such a limit has been exceeded. Further, a second one of the optical detectors may output an optical signal in response to the sum of optical signals input to the second one of the optical detectors exceeding a second limit that may be different than the first limit. In certain implementations, one or more of the detectors exhibits variable transmissivity. In other embodiments, one or more of the optical detectors produces a signal based on a sum of optical signals provided to the optical detector (e.g., a maximum intensity). In yet other embodiments, one or more of the optical detectors outputs an optical signal in response to the sum of optical signals input to the optical detector exceeding a proportional limit of the optical detector (e.g., at an inflection point). Such detectors may, for example, be operable for physical or effective insertion and/or removal from the optical path.

The respective stages are implemented in one or more of a variety of manners. In some implementations, a first one of the optical processing stages normalizes the optical signals, and passes the normalized signals to the output and/or and the respective ones of the optical detectors. In some instances, one or more stages engage with the plurality of detectors for insertion and removal thereof, and to facilitate replacement of the plurality of optical detectors with optical detectors having different characteristics. In various implementations, each stage provides arithmetic operations on two or more optical input signals. The stages may, for example, process signals in parallel, or in series. In some instances, one or more of the stages are implemented with a micro array of at least one of loops and dots, and at least two orthogonal loops at each node.

The optical apparatus may be implemented using a variety of manufacturing approaches, and a variety of configurations. In some embodiments, a number (N) of semiconductor wafers are stacked and may be separated by an oxide. In some implementations, the wafer includes a matrix of pillars, each having with a respective amount of oxidation that sets respective field breakdown and/or frequency transmission ranges.

Turning now to the figures, FIG. 1 shows an apparatus 100 including an optical analysis network in accordance with one or more embodiments of the present disclosure. The optical analysis network includes two or more processing stages (110 and 111 shown), and an aperture 120 that receives a plurality of optical signals. The optical processing stages (levels) process the plurality of optical signals. The optical processing stage 110 has inputs coupled to receive and scale the plurality of optical signals, and includes components as labeled (redundant components in stage 111 are not labeled). Each optical processing stage includes a plurality of optical detectors (including 130 and 131) and a beam distribution circuit 140 that provides optical signals from inputs of the stage to the respective plurality of optical detectors as well as to outputs. One or more processing stages may also include calibration circuits.

The components of the optical analysis network shown in FIG. 1 may be implemented using various structures and methods. For example, in some implementations, the aperture may include a thin refractive wedge or non-attenuating spectrometer. The Beam Distribution circuits may include various components (141 and 142 shown by way of example) that may include, for instance, beam splitters, dichroic mirrors, filters (e.g., F(x) and G(x)), lenslets, collimators, attenuators, combinors and/or polarization elements that may be configured to analyze an array of optical pulses for any number of characteristics, e.g., their number and intensity per unit bandwidth. Calibration circuitry of a processing stage may include, for instance, measurements and renormalization of peak or integral intensities that are configured to minimize total delay or circuit length. Optical detector circuits may include solid state electronic, optoelectronic or superconducting means that are specifically configured to use fiber optics to distribute and/or measure the desired characteristics. It is important to point out that most of the distribution elements above can be planarized on wafers.

Various embodiments may be used in various applications to provide parallel processing of optical signals. For instance, an optical analysis network may be applicable to various applications including, but not limited to, detection and processing of optical signals transmitted over an optical channel (e.g., fiber optics) or captured from the external environment (e.g., laser or ambient light captured from the external environment). For example, various embodiments provide benefits and possibilities of combining the capacities of the remote smart phone with photonic bandgap crystals or fiber optics. In some embodiments, a data logging apparatus is configured to record an array of samples simultaneously (i.e. in parallel) with very high time resolution and repetition rate. The addition of outputs for control provides for better communication and information to external entities. Because these are optical, various embodiments may avoid the usual electronic pickup problems but subject to wavelength and scattering limitations.

Various embodiments employ aspects of Parallel Light Detection and Ranging (LIDAR), which is an extension of radar. Certain embodiments provide broadband, parallel I/O and, in some instances, time reversible (TR) hardware. Among many applications for this, one might use it to measure the time dependence of correlations between disparate kinds of data ranging from medical characteristics to stock market prices in real time, where it is noted that the latter may include the usual stock averages that are computed values but can be provided simultaneously to high precision with very small delays that only depend on the computational scheme employed. Aspects of the disclosure may be implemented in an optimally fast manner for these tasks and that some various embodiments provide a means for solving more complex problems that, so far, have eluded conventional means.

Various embodiments are directed to implementation of optical processing as described herein with mobile devices (e.g., smartphones), such as for productivity in science and technology, industrial or business applications. Frequency (or wavelength λ) is a significant variable that determines the scale of a resulting parallel device.

In some embodiments, scalable parallel devices are manufactured by etching a matrix of posts or pillars onto a silicon wafer, or a matrix of carbon (graphene) nanotubes are fabricated. Whenever breakdown fields are important, the silicon matrix could be oxidized in various ways to silica. Also, the end tips can be coated, wrapped or micro-machined to vary responsivity and frequency response or its variations over the pixels of any resulting matrix including the optimization of two-way unitarity or time reversal invariance. While this can be implemented to provide a high density, high resolution TV, it may be extended or extensible via fiber optic magnification to much larger screens or projectors in the home. This provides a natural segue into the sequential combination of screens to provide virtually unlimited computing power or optical analyzing power with increasing screens N.

Aspects of the present disclosure are directed to parallel processing of parallel input/output optical signals, which can be implemented for existing and new generations of mobile devices such as cell phones. Referring to FIG. 1, the functions $F_i$ and $G_i$ may relate specifically to optical channel i, e.g., at input in Stage 1 to the calibration weights required to normalize the various input channels to a common standard. A matrix of optical channels can be produced in various ways from a single input pulse to analyze it either spatially (longitudinally and transversely), spectrally or both. Using optical fiber, these can be run through or terminated into a matched lenslet array that in turn may be matched to a spectral filter array. This can then be terminated at the detector array for output, fed back to the source, or allowed to pass through a set of matched, lossless analysis loops before recombining (or not) and being output to the next discrete analysis layer.

Various embodiments are directed to implementation with a variety of devices, such as a photoelectric sensor, or a voice centric device such as a wearable telephone (e.g., integrated with a worn object such as glasses or wristwatch). These may be single channel devices. For instance, the parallel computational approach described herein may be used to facilitate communication requirements for parallel smart phones.

Parallel data input, analysis and output is ideally suited and demands parallel computation as demonstrated using optical analysis network architectures. Optical networks as characterized herein provide an optimally efficient and fast approach in terms of the number of machine cycles required to make a computation. Such an optical analysis network might be implemented using variable transmission gates or filters for the weights that adjust each input to the analysis network. This can be implemented in any number of ways e.g. using an electrical grid that controls the local transmissivity of a thin electro-optic overlay membrane with every input and/or output layer of the net. Note that there are many other ways to implement variable filters in real time—some of which are ideally suited to the proposed parallel computation scheme.

Figure 2:
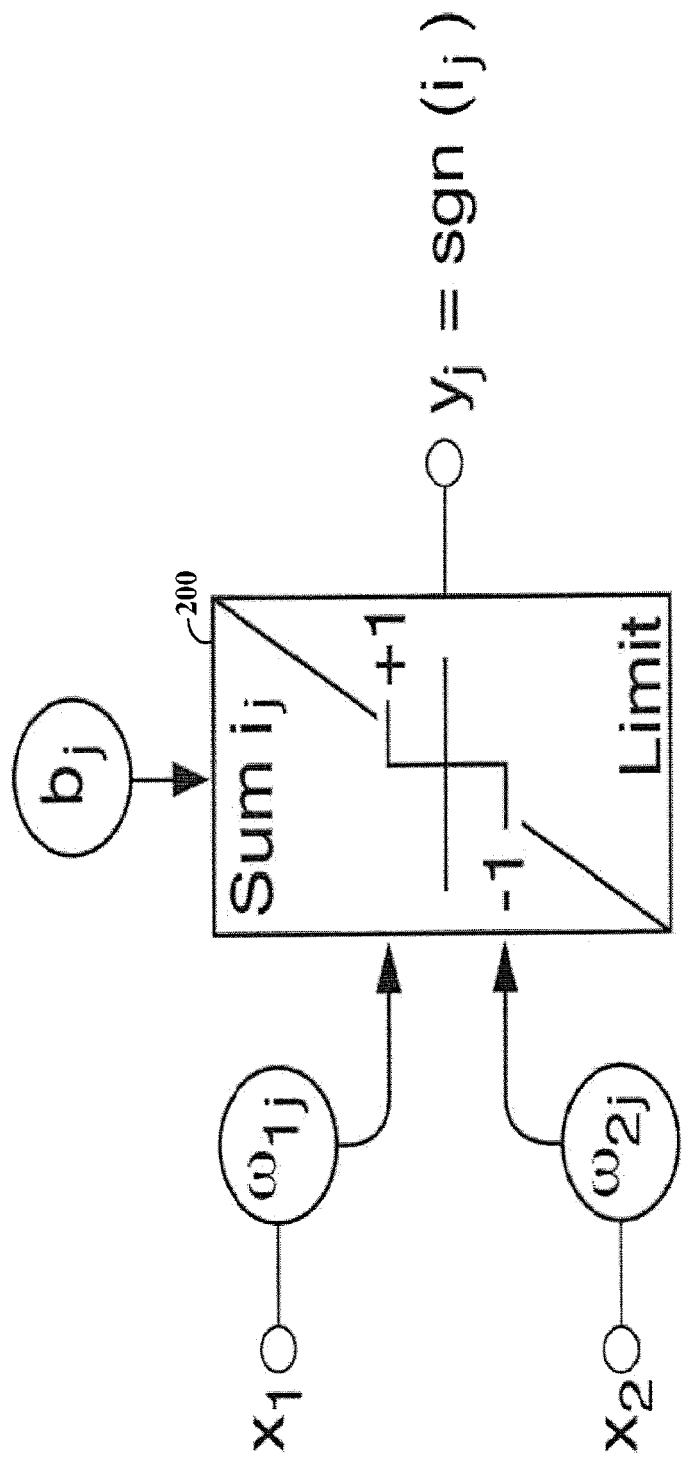
FIG. 2 shows a block diagram of a processing stage or elementary node in accordance with one or more embodiments of the present disclosure.

FIG. 2 shows a block diagram of a processing stage or node 200 that may be used to implement an optical analysis network in accordance with one or more embodiments of the present disclosure. More specifically, FIG. 2 shows a 2 input/1 output processing stage that can be connected to form various optical analysis networks that may be used in many applications (e.g., in medical environments to monitor patients under differing and easily modified conditions and to call nurses or doctors.) It can get increasingly complex, e.g., by monitoring M inputs to make one or more output decisions. As briefly explained here, this is an optical neuron where $y_j(t+1)=f_j(i_j)$ and $i_j=\omega_{1j}x_1(t)+\omega_{2j}x_2(t)+b_j$ so there are $2^{(N-2)}=4$ possible input states, where f is the transfer function and b is the bias. For some example electronic network arrangements that may be adapted to form optical analysis networks, reference may be made to *Real-Time Applications of Neural Nets*, IEEE Transactions NS-36, p. 1480-5 (1989), which is fully incorporated by reference herein. Example electronic network arrangements may also be found in *Com-*

*putation and Control with Neural Networks*, A. Corneliusen, P. Terdal, T. Knight and J. Spencer, Nuclear Instruments and Methods in Physics Research A293, p. 507-516 (1990), which is fully incorporated by reference herein.

In some embodiments, a medical device includes an optical analysis network configured to process optical inputs to monitor temperature of an object or patient. For instance, to monitor a patient's temperature T, a device may determine the temperature relative to a norm $\underline{T}$ for that patient with $\delta_T = T - \underline{T}$ together with a known or measured standard deviation $\sigma_T$. Then, it can issue an RF output or other signal for a set of phone calls or alerts when $\delta_T > \sigma_T + b$ after adjusting the bias b(t) as deemed necessary by the circumstances.

Note that such measurements don't have to be "invasive" as with current thermometers but could be remote. For instance, a portable fiber-optic data-logger thermometer available from Omega, or a "Visual IR Thermometer" VT02 available from Fluke and using a thin gyro-electric array may be implemented with various embodiments (e.g., replacing a serial communication port with parallel communications as described herein). For instance, an optical network can be used to process optical data in accordance with one or more embodiments of the present disclosure.

There are many other physiological parameters that would be good to monitor simultaneously and process in-parallel. However, for many applications, considerable computational power is needed to learn and develop increasingly complex, unique functional representations as well as the tools to obtain the necessary data sets.

Figure 3:
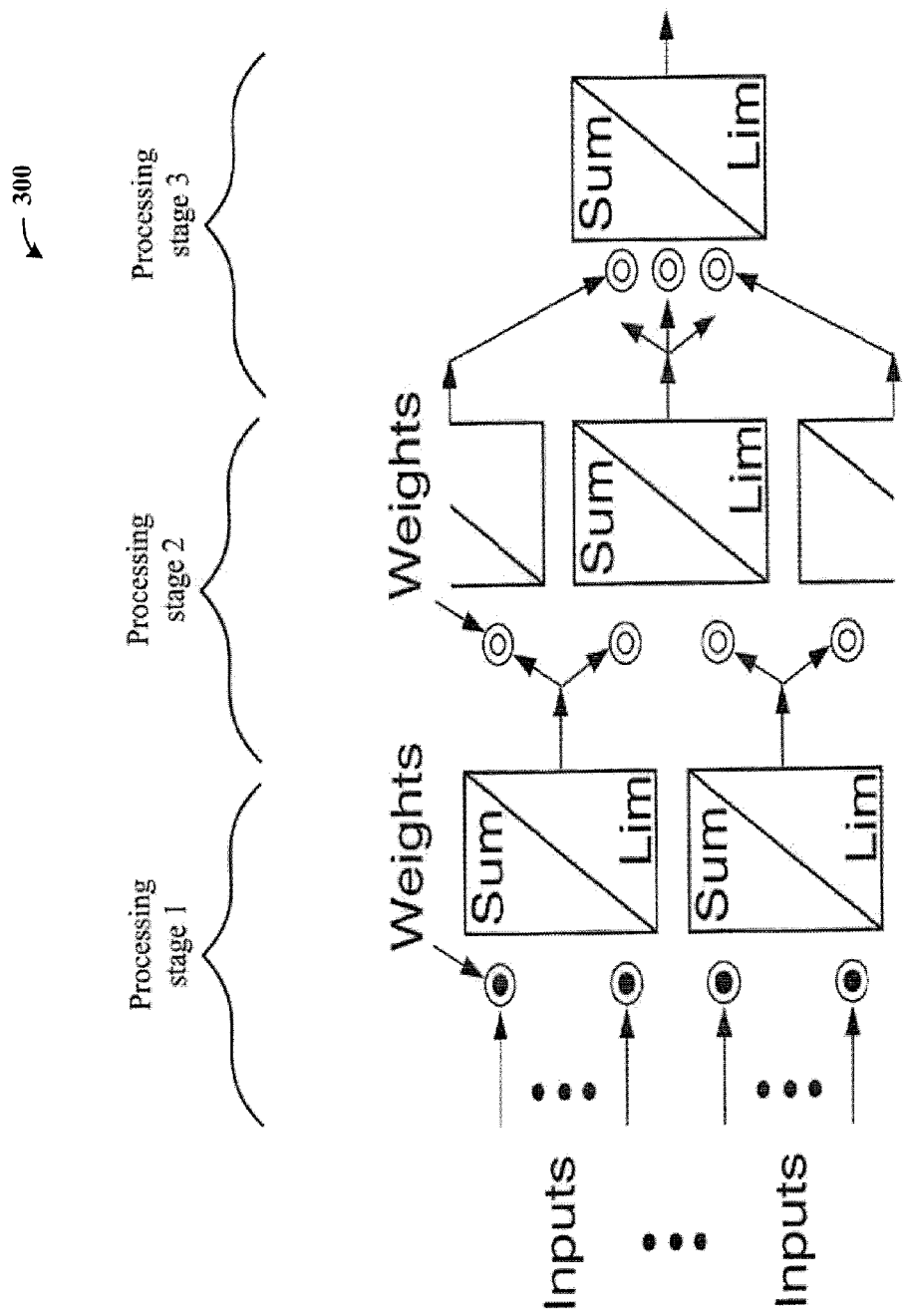
FIG. 3 shows an example optical analysis network architecture in accordance with one or more embodiments of the present disclosure.

FIG. 3 shows a schematic of an optical analysis network architecture 300, in accordance with one or more embodiments of the present disclosure. In this example, the network includes three optical processing stages configured to process the plurality of optical signals. Each optical processing stage includes a plurality of optical detectors and a beam distribution circuit. The beam distribution circuit is configured and arranged to provide optical signals from inputs of the stage to the respective plurality of optical detectors. Transmission and distribution between optical detectors of different layers (processing stages) is performed by the beam distribution circuits and can be made static or dynamic by using, e.g., dichroic mirrors, beam splitters and filters that may be made adjustable and where the internal transmission of each element can be based on the wavelength (broadband or narrow) and/or intensity of their inputs after they have been cross-synchronized. The inputs, shown as circles with black dots outside of each box, are individual fibers of comparable length that can be tuned or synchronized as can the input filters for intensity. The termination of these fibers at the decision boxes can be made using different crystals with transparencies defining selected wavelengths as discussed further below. Generally, optical fiber is TR invariant over short enough distances but typical detectors, e.g., a broad class of pyrometers, are not.

Figure 4:
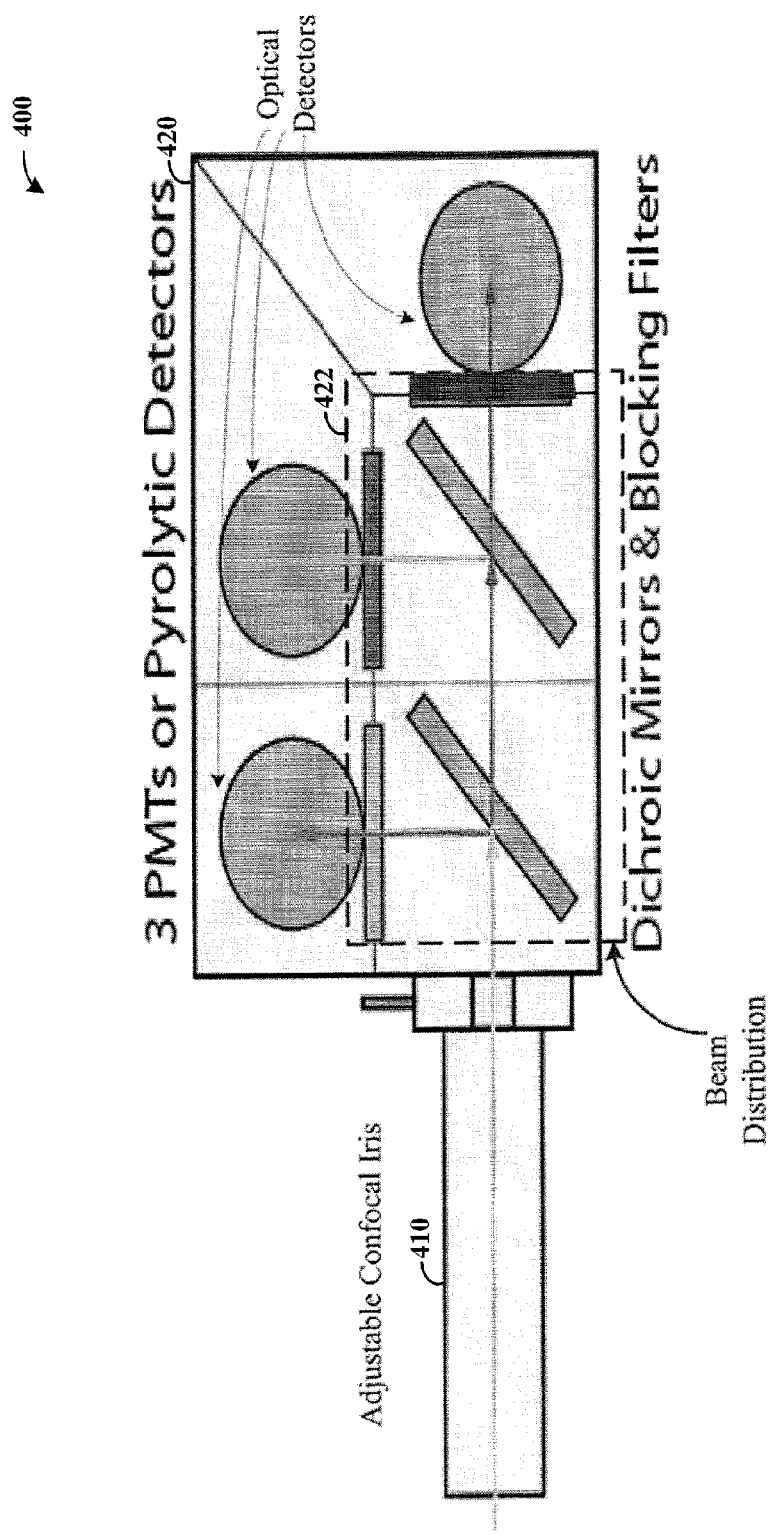
FIG. 4 shows an abbreviated optical analysis network having a single processing stage in accordance with one or more embodiments of the present disclosure.

FIG. 4 shows an optical analysis network 400 having a single processing stage in accordance with one or more embodiments of the present disclosure. This optical network includes an aperture 410 configured and arranged to receive a plurality of optical signals and one optical processing stage 420 having inputs coupled to receive the plurality of optical signals via a beam distribution circuit. In this example, a beam distribution circuit 422 includes a plurality of dichroic mirrors and blocking filters configured to provide respective signals of different weights to different optical detectors that may be inserted or removed to allow use of the input optical pulses. In this example, the network includes one processing stage including three optical detectors (e.g., pyrolytic detectors). However, in many embodiments, additional processing stages having a larger range may be needed for adequate processing.

Such analysis networks may be used for a variety of applications and can be implemented in a variety of ways, e.g., using various methods and materials one can demonstrate an "all optical device" (or system) for analyzing virtually any topological array of optical pulses. For instance, in the 1×3 matrix example shown in FIG. 4 a pulse is analyzed or partitioned into three frequency bands. The choice of detectors depends on the range and sensitivities required but the types may well be mixed within a single system when cross calibrated.

Figure 5:
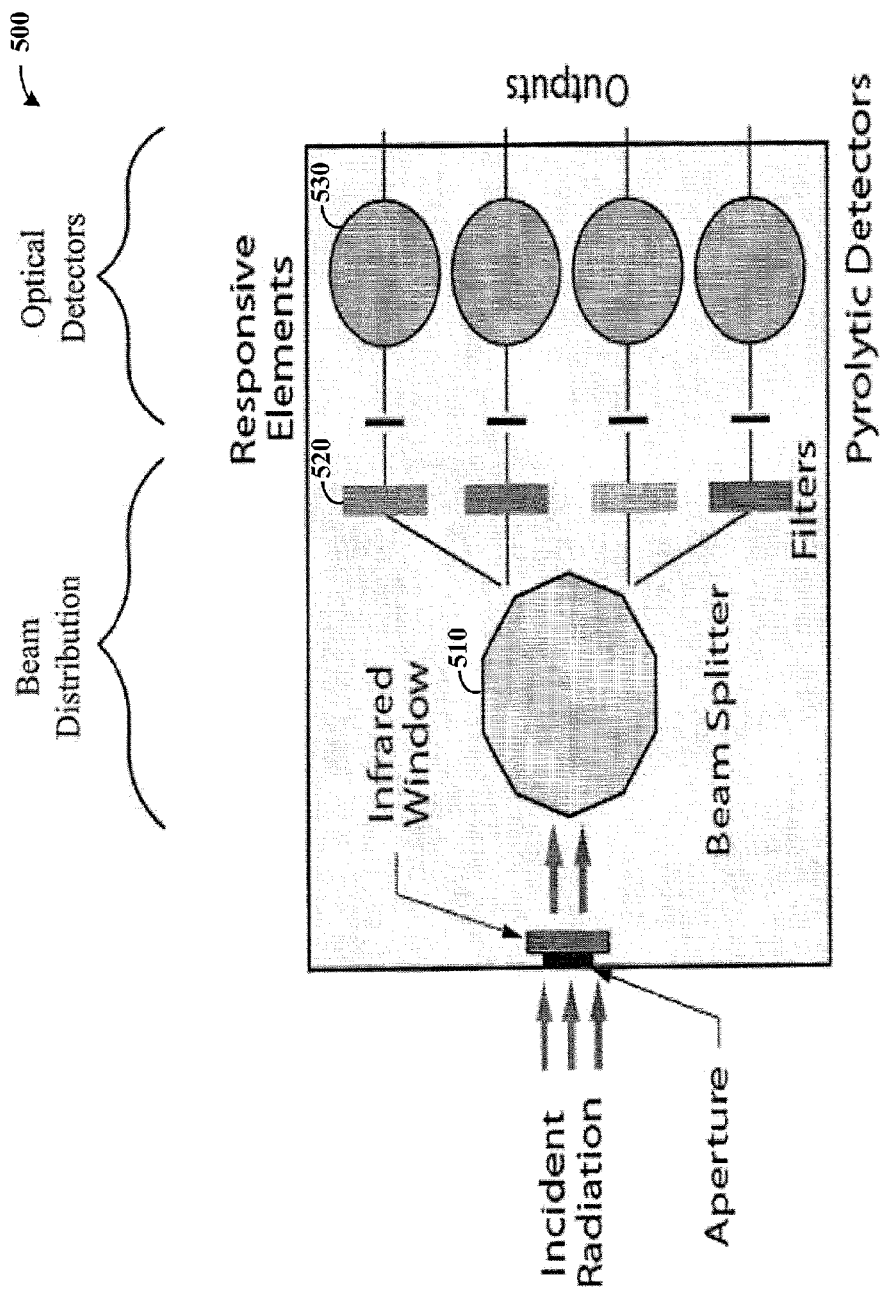
FIG. 5 shows another optical analysis network having a single processing stage in accordance with one or more embodiments of the present disclosure.

FIG. 5 shows another optical analysis network 500 having a single processing stage in accordance with one or more embodiments of the present disclosure. Similar to the analytical net shown in FIG. 4, this network includes an aperture configured and arranged to receive a plurality of optical signals and one optical processing stage having inputs coupled to receive the plurality of optical signals via a beam distribution circuit. In this example, the beam distribution circuit includes a beam splitter 510 and a plurality of filters (including 520) to provide respective signals of different weights to different optical detectors (including 530). In this example, the optical analysis network includes one processing stage including four optical detectors (e.g., pyrolytic detectors). However, in some embodiments, additional processing stages may be included for better processing. The detectors can be mixed or the circular elements in the diagram might represent photonic bandgap (PBG) fibers with the appropriate bandgaps and modes to transmit the signals to the next functional element or other optical subsystem in a TR invariant way.

Various embodiments are directed to parallel, PBG fiber optics that provide a faster, more compact approach. It is worth mentioning that even the conventional electronic computer can easily keep up with and exceed the cycle rate of many industrial processes as well as purely mechanical ones or even electro-chemical ones such as occur in the brain but only for simple, conventional, single channel, serial processes that one might well describe as "von Neumann type processes". Various embodiments may be implemented with or replace software-based multitasking systems (e.g., MIMO systems).

As indicated above, aspects of the present disclosure may be applied to a number of applications. Some examples of applications for such capabilities are based on their use in observational and fast feedback control systems that do not have to call a practitioner but instead replaces them or allows them to do other tasks. In fact, one can envision their remote control of robots as the most important part of the robot itself or even as an advanced micro-bot catheter for diagnosis and surgery using lasers and/or their combination with newer, higher-accuracy tomographic measurement techniques. Making such devices available in emergency room environments, critical-care facilities or in the home to continuously monitor patients could prove invaluable, and less costly. Such approaches may be used in manufacturing and optimizing adaptive arrays such as antennas or detector arrays to decrease both the costs of assembly and their subsequent fine-tuning or correction. In another embodiment, independent laser beams are combined or manipulated in different ways e.g. to pulse shape them or to increase their peak intensity in a dynamic way. Closely spaced, but physically adjustable PBG fibers that support a common wavelength with large enough bandgap width can be used to develop heuristics.

Beyond integrating disparate components into a common structure that incorporates smart devices, various embodiments are directed to replacing and sparing human involvement in unknown or potentially dangerous environments. Such environments include space applications and deep underwater projects such as exploration and sample capture that provide the potential for dramatic decreases in the size and cost of such ventures. Also, chemical mining and exploration companies as well as nuclear testing of various kinds or medical isotope production must surely have unmet applications. Various accelerators may be used, such as those above 5-10 MeV.

Various embodiments address issues in combining different materials in a chip environment that can be problematic often for the mismatches in material properties such as their thermal expansion characteristics. For instance, LIDAR can be implemented with enhanced feedback for enhanced learning and control in fields such as medicine, Homeland Security and autonomous control that are related to pump-probe experiments or those multiplying the functionality or power of the laser itself.

One or more of the disclosed embodiments provide a manner in which to increase bandwidth, intensity and resolving power within an existing experimental setup or its footprint or in new fiber/laser combinations. Thus, this might augment any number of explorations at the frontier of modern science especially at the so-called intensity frontier where it may well be the least expensive and most straightforward to pursue when one considers the problems of varying the power stably in a single output laser. Implementing a smart, stand-alone detector as characterized herein can provide greatly reduced scales as well as improved resolution. Important examples abound especially in space-based cosmology experiments e.g. to rapidly and accurately define and enumerate star and galaxy counts as well as their spectral distributions.

For additional information regarding optical communication and signal processing, reference may be made to: U.S. Patent Pub. No. 2011/0298397, filed on Aug. 2, 2010, entitled "Special Purpose Modes in PBG Fibers;" and U.S. Pat. No. 7,551,819, filed Mar. 1, 2007, entitled "Multiple-Core Photonic-Bandgap Fiber With Coupling Between The Cores." These publically-available documents are fully incorporated by reference herein. These references especially relate to the energy (and energy density) frontiers of modern science.

The aspects discussed therein may be implemented in connection with one or more of embodiments and implementations of the present disclosure (as well as with those shown in the figures), and in the underlying provisional application to which benefit is claimed. One or more detectors in the above examples may be connected to provide electronic output signals to various modules and/or other circuit-based building blocks may be implemented to carry out one or more of the operations and activities in response to the electronic output signals as described herein. In such contexts, a "module" is a circuit that carries out one or more of these or related operations/activities. For example, in certain of the above-discussed embodiments, an apparatus includes an optical analysis network configured to determine an average temperature of an object based on infrared signals of a captured image and provide an electronic signal indicative of the average temperature. In this example, the apparatus may include modules configured to perform additional processing of the signal (e.g., monitoring and logging the average temperature over time) and/or perform actions in response to the average temperature (e.g., trigger medical alert system, control medical equipment or administration of treatment based on the determined average temperature). The one or more modules are discrete logic circuits or programmable logic circuits configured and arranged for implementing these operations/activities, as in the circuit modules shown in the Figures. In certain embodiments, the programmable circuit is one or more computer circuits programmed to execute a set (or sets) of instructions (and/or configuration data). The instructions (and/or configuration data) can be in the form of firmware or software stored in and accessible from a memory (circuit).

Furthermore, it would be understood that the various aspects, including for instance the parallel processing of optical signals using an optical analysis network may be used for various applications which include detection and processing of optical signals transmitted over an optical channel (e.g., fiber optics) or captured from the external environment (e.g., laser or ambient light captured from the external environment). For example, laser or ambient light of various spectral frequencies may be detected and analyzed to perform various operations including but not limited to, light sensing, motion detection, speed detection, image capture, audio sensing, temperature sensing, humidity sensing, particle detection, spectral composition analysis, distance calculation, and communications. In various implementations, the distributions of such processes and their analysis such as via Fourier transforms are used for feedback control.

It is recognized that various embodiments may include a number of other various aspects in different combinations. The following aspects provide some non-limiting examples of aspects that may be included in various embodiments.

For some embodiments, one part of an optimal, parallel, smart device is a parallel optical computer that can be illustrated by constructing a parallel optical network with a structure such as shown in FIG. 3. If one compares the optical to the electronic result in FIG. 8 of Ref 1 of the underlying provisional application, it takes about 2.5 ns to switch between multiplies. This implies an effective vacuum length of L=750 mm for the optical circuit. In terms of physical wafers, this is equivalent to L-1500 standard wafers of Si, SiO2 or other combinations of materials ignoring any index corrections. Using approaches as discussed herein, a vacuum length can be achieved that is less than or equal to 1% of an effective optical vacuum length of an equivalent electronic apparatus.

Some other aspects are directed toward wafer scale arrays with focusing or lenslet, collimator, attenuator, combiner and logic arrays lithographically engineered to reduce the effective number of wafers required to less than 1% of L for a cycle time improvement of 100 or so. Some other aspects are directed toward melding data and mobile applications. In this context, certain variables can be effectively eliminated in various ways, e.g., by simultaneous acquisition of specific data arrays as well as their sequential acquisition at a uniform separation in time. Then, only (nM+1) numbers are used rather than the expected n(M+1) when n is the number of array acquisitions and when time is an independent variable. Accordingly, a figure of merit characterizing the time spacing between successive signal acquisitions can be utilized in this regard.

Various embodiments address issues concerning parallel data acquisition, synchronism, simultaneity of inputs, I/O cross talk, and the like. An important point may require different approaches, which may specifically involve comparators of the circuit's response to the "same" signal with feedback for cross calibration (i.e. adjustment of the circuit's input and/or output weights). Issues relating to time or phase of channels where "knobs" are important are addressed, as related to the amplitude weights and shape considerations. For instance, optical knobs may include control of individual I/O fiber links/channels or new types of terminations, tapers or insertions as well as variable index filter arrays and/or cassettes.

Other aspects are directed toward polarization measurement and manipulation. Polarization measurement and manipulation is possible in various ways e.g. using a micro array of SC, e.g., loops or dots with at least two or more orthogonal loops at each node. These are also good, frequency-sensitive pickups for an array with a broad range of potential uses including transmission as reversible antennas. Also, including structure, both locally at the nodes and/or globally over the array, one could provide significant structure or directivity to the output radiation pattern from the structure that has many uses, e.g., encoded or safe transmissions.

Some other aspects are described in the context of an optical network having an M×M matrix. Ideally, for an M×M matrix, the transmission rate can be augmented by $M^2$. A gain may be achieved for the parallel optical approach of 100 $M^2$ or $10^8$ for M=1000. For nominal 1 GHz channel rates this gives a 100 PHz data rate (100 quadrillion/s) so that incremental improvements appear irrelevant unless they address specific questions such as signal sensitivities or measurement accuracies.

Various implementations relate to planar or 2D and using only a very small fraction of a single wafer's thickness. Other implementations are directed to a matrix of pillars that can be etched on silicon and can be selectively oxidized, e.g., to make them more resistant to strong field breakdown or to have a broader frequency transmission range. Also, a complement of posts can be implemented in the form of non-imaging indentations or optics that can be etched in. Either type of structure can be modified for specific properties or sensitivities via coating, wrapping or further micro- or nano-machining. It is emphasized that most COTS optical planarized elements have a thickness based on the transverse size and its ease of handling for a single dedicated use rather than what is required by its function. One implication is that both surfaces can be used for some disclosed applications as opposed to current practice. Further, this approach can be implemented to provide an opportunity for a single layer I/O and signal processing unit.

For embodiments including multiple wafers, e.g., to implement an optical computer structure, alignment references may be included to align the wafers relative to one another. This may be accomplished using special wafers (with thin layers of $SiO_2$ for wavelengths below the bandgap of Si) and multiple preparation steps that culminate in being able to simultaneously align all wafers or groups that have already been previously aligned to the required tolerances. This may require ultra-large and long wavelength ultrasound that can handle large wafers.

The use of carbon (graphene) nanotubes may involve special techniques based on the errors involved in trying to construct the nanotube matrix, e.g., this matrix may not be square or uniformly ordered. This lack of uniformity can be handled in real-time based on the intimate coupling and overlap between the network detectors, the computer structure and the appropriate heuristic learning procedure. An important point is that this may not be a particularly important concern for many if not most problems of this kind for the disclosed method of solution.

Various embodiments are directed to the medical equipment and monitoring area. Others are directed to banking, such as by facilitating simultaneous withdrawal queries from any one account over an entire banking system to check solvency or malfeasance before issuing the withdrawal, e.g., from automatic teller outlets in real time.

In some embodiments, a network processes differential equations, where certain input weights particularize the equations based on feedback from non-stationary data inputs. In such cases, an automatic starting guess is made for a new solution for new equation constants. Another more approach involves constructing memories or dictionaries based on past learning, with the addition of ancillary memories, for the different subjects based on their correspondingly derived weights, e.g., showing correlations or lack of independence.

It is useful to point out that, although TR invariance is not expected in digital electronic networks for the usual reasons (unless this was specifically intended or developed), TR invariance can be expected and developed for an optical analysis network system because the arrow of time is intended to go in only one direction as a vector that terminates at the detectors or other non-unitary elements.

The disclosed embodiments can be extended to higher dimensions than two by considering tensors that can be decomposed into groups of matrices that share one or more dimensions in common or that have included a different but related timestamp or representation. Scalars, vectors and matrices are tensors where e.g. the matrix is an order two tensor. In some embodiments, lasers are used to obtain accurate clock times and step sizes so that each component of the tensor might have its own associated time component with many sharing the same values to very high accuracy during a single transmission cycle.

Based upon the above discussion and illustrations, those skilled in the art will readily recognize that various modifications and changes may be made to the present disclosure without strictly following the exemplary embodiments and applications illustrated and described herein. For example, the input terminals as shown and discussed may be replaced with terminals of different arrangements, and different types and numbers of input configurations (e.g., involving different types of input circuits and related connectivity or topologies). Such modifications do not depart from the true spirit and scope of the present disclosure, including that set forth in the following claims.

What is claimed is:

1. An apparatus comprising:
    an optical element;
    an aperture configured and arranged in the optical element to receive a plurality of optical signals; and
    at least one optical processing stage having inputs coupled to receive the plurality of optical signals as passed via the aperture, each stage including:
        a plurality of optical detectors; and
        the optical element which is configured and arranged with the aperture to provide optical signals from inputs of the stage to at least one of an output and respective ones of the plurality of optical detectors; and
    wherein
    the at least one optical processing stage includes first and second ones of the optical processing stages, and
    the optical element in the first stage is configured and arranged with the aperture to provide the optical signals to the second stage, via the output.

2. The apparatus of claim 1, wherein:
    a first one of the optical detectors is configured to output an optical signal in response to a sum of optical signals input to the first one of the optical detectors exceeding a first limit; and a second one of the optical detectors is configured to output an optical signal in response to the sum of optical signals input to the second one of the optical detectors exceeding a second limit.

3. The apparatus of claim 1, wherein the plurality of optical detectors are configured and arranged with variable transmissivity for collecting light.

4. The apparatus of claim 1, wherein a first one of the at least one optical processing stage is configured and arranged to normalize the optical signals, and to pass the normalized signals to at least one of the output and the respective ones of the plurality of optical detectors.

5. The apparatus of claim 1, wherein the at least one optical processing stage is configured and arranged to engage with the plurality of detectors for insertion and removal thereof, and to facilitate replacement of the plurality of optical detectors with optical detectors having different characteristics.

6. The apparatus claim 1, wherein each optical detector is configured and arranged to produce a signal dependent on a sum of optical signals provided to the optical detector.

7. The apparatus of claim 1, wherein at least one of the optical detectors is configured to output an optical signal in response to a sum of optical signals input to the optical detector.

8. The apparatus of claim 1, wherein each stage is configured and arranged to provide arithmetic operations on two or more optical input signals.

9. The apparatus of claim 1, wherein the at least one optical processing stage includes at least two stages configured and arranged to receive and process the plurality of optical signals in parallel.

10. The apparatus of claim 1, further including a filter configured and arranged to adjust amplitude of each signal based on feedback from one of the at least one optical processing stages.

11. The apparatus of claim 1, wherein the at least one optical processing stage includes a stage having a micro array of at least one of loops and dots, and at least two orthogonal loops at each node.

12. The apparatus of claim 1, further including a semiconductor wafer configured and arranged with a matrix of pillars, each configured and arranged with a respective amount of oxidation to have a respective field breakdown and/or frequency transmission range.

13. The apparatus of claim 1, wherein the at least one optical processing stage includes a stage having a plurality of stacked semiconductor wafers separated by respective oxide layers.

14. The apparatus of claim 1, wherein the optical element includes at least one of a beam splitter, dichroic mirror, filter, lenslet, collimator, attenuator, and combiner.

15. The apparatus of claim 1, further including an optical processor configured and arranged to detect correlations between parallel optical data sets simultaneously input to the at least one optical processing stage.

16. The apparatus of claim 1, wherein the aperture is configured and arranged to modify light passed through the aperture in accordance with at least one of intensity and polarization.

17. An apparatus comprising:
means, including an aperture, for receiving a plurality of optical signals; and
optical processing means having multiple stages and coupled to receive the plurality of optical signals via the means for receiving, each stage including:
a plurality of optical detectors; and
an optical element configured and arranged with the means for receiving to provide optical signals from inputs of the stage to at least one of an output and respective ones of the plurality of optical detectors, wherein the plurality of optical detectors and the optical element are configured and arranged to:
in a first one of the plurality of optical detectors, output an optical signal in response to a sum of optical signals input to the first one of the optical detectors exceeding a first limit; and
in a second one of the optical detectors, output an optical signal in response to a sum of optical signals input to the second one of the optical detectors exceeding a second limit.

18. A method comprising:
receiving, via an aperture, a plurality of optical signals;
for each of a plurality of optical stages, receiving the plurality of optical signals as passed via the aperture and providing optical signals from inputs of the stage to at least one of an output and respective ones of a plurality of optical detectors;
in a first one of the plurality of optical detectors, outputting an optical signal in response to a sum of optical signals input to the first one of the optical detectors exceeding a first limit; and
in a second one of the optical detectors, outputting an optical signal in response to the sum of optical signals input to the second one of the optical detectors exceeding a second limit.

* * * * *